(12) United States Patent
Takeshita

(10) Patent No.: US 12,345,298 B2
(45) Date of Patent: Jul. 1, 2025

(54) ROTARY POWER TRANSMISSION DEVICE WITH CLUTCH

(71) Applicant: GKN Automotive Limited, Birmingham (GB)

(72) Inventor: Kazunobu Takeshita, West Bloomfield, MI (US)

(73) Assignee: GKN Automotive Limited, Birmingham (GB)

( * ) Notice: Subject to any disclaimer, the term of this patent is extended or adjusted under 35 U.S.C. 154(b) by 99 days.

(21) Appl. No.: 18/239,545

(22) Filed: Aug. 29, 2023

(65) Prior Publication Data

US 2024/0084856 A1   Mar. 14, 2024

Related U.S. Application Data

(60) Provisional application No. 63/405,917, filed on Sep. 13, 2022.

(51) Int. Cl.
  *F16D 11/10* (2006.01)
  *F16H 48/24* (2006.01)
(52) U.S. Cl.
  CPC .............. *F16D 11/10* (2013.01); *F16H 48/24* (2013.01)

(58) Field of Classification Search
  None
  See application file for complete search history.

(56) References Cited

U.S. PATENT DOCUMENTS

| | | | |
|---|---|---|---|
| 6,379,277 B1 * | 4/2002 | Victoria | F16H 48/22 74/606 R |
| 8,287,417 B2 | 10/2012 | Sudou et al. | |
| 2011/0105264 A1 | 5/2011 | Maruyama et al. | |
| 2014/0004988 A1 | 1/2014 | Yamanaka et al. | |
| 2017/0297428 A1 | 10/2017 | Inose et al. | |
| 2021/0317902 A1 * | 10/2021 | Komatsu | F16H 48/34 |

* cited by examiner

*Primary Examiner* — Vicky A Johnson
(74) *Attorney, Agent, or Firm* — Reising Ethington P.C.

(57) ABSTRACT

A rotary power transmission device, includes a housing, a pinion gear shaft received within the housing and having an axis, a pinion gear rotatable relative to the pinion gear shaft, and first and second clutch members. The first clutch member has a rotational axis, radial inner and outer surfaces, front and rear faces, and multiple teeth at the front face. The second clutch member is coaxially arranged with the first clutch member, and has radial inner and outer surfaces, front and rear faces, and multiple teeth. The pinion gear has an interface surface extending radially from the opening and the radial inner surface of the first clutch member is located axially outwardly of the interface surface and the radial inner surface of the first clutch member fully overlaps the interface surface.

19 Claims, 3 Drawing Sheets

ROTARY POWER TRANSMISSION DEVICE WITH CLUTCH

REFERENCE TO RELATED APPLICATIONS

This application claims the benefit of U.S. Provisional Application Ser. No. 63/405,917 filed on Sep. 13, 2022 the entire content of which is incorporated herein by reference in its entirety.

TECHNICAL FIELD

The present disclosure relates generally to a rotary power transmission device with a clutch.

BACKGROUND

In general, vehicle drivelines transmit torque from a vehicle's engine to its wheels. Automotive drivelines sometimes include a drive unit with a disconnect device for selectively distributing torque to the wheels. Drive units may incorporate or connect to a differential that may be changeable between locked and unlocked states. The disconnect device or differential may include a clutch that transmits torque when engaged and does not transmit torque when disengaged. The clutch components are received within a housing and there is a need to reduce the size and weight of the devices as well as the clutch components while still meeting strength and durability requirements.

SUMMARY

In at least some implementations, a rotary power transmission device, includes a housing, a pinion gear shaft received within the housing, the pinion gear shaft having a pinion gear shaft axis, a pinion gear having an opening through which the pinion gear shaft is received so that the pinion gear is rotatable relative to the pinion gear shaft, a first clutch member and a second clutch member. The first clutch member has a rotational axis perpendicular to the pinion gear shaft axis, a radial inner surface, a radial outer surface, a rear face and a front face axial spaced, relative to the rotational axis, from the rear face, and multiple teeth at the front face. The second clutch member coaxially arranged with the first clutch member, a radial inner surface, a radial outer surface, a rear face and a front face that is axially spaced, relative to the rotational axis, from the rear face, and multiple teeth. The pinion gear has an interface surface extending radially from the opening and the radial inner surface of the first clutch member is located axially outwardly of the interface surface and the radial inner surface of the first clutch member fully overlaps the interface surface.

In at least some implementations, the interface surface is shaped as part of a sphere and a portion of the radial inner surface of the first clutch member that overlies the interface surface is complementarily shaped as part of a sphere.

In at least some implementations, the teeth of the first clutch member and the teeth of the second clutch member are parallel to each other and are axially inclined such that the teeth do not extend parallel to the pinion gear shaft axis.

In at least some implementations, the radial inner surface of the front face of the first clutch member is farther from the pinion gear shaft axis than the radial outer surface of the front face of the first clutch member.

In at least some implementations, the pinion gear includes teeth extending radially outwardly beyond the interface surface, and the interface surface extends at least 50% of the distance from the opening to the root of the teeth of the pinion gear.

In at least some implementations, the first clutch member is coupled to the pinion gear shaft so that the first clutch member does not move relative to the pinion gear shaft and the pinion gear rotates relative to the first clutch member.

In at least some implementations, the first clutch member includes an opening in which the pinion shaft is received, and the distance from the opening to the front face of the first clutch member is equal to or greater than the distance from the opening to the rear face of the first clutch member.

In at least some implementations, the front face of the first clutch member is annular and convex. In at least some implementations, the front face of the second clutch member is annular and concave.

In at least some implementations, a clutch for a rotary power transmission device, includes a first clutch member and a second clutch member. The first clutch member has a rotational axis, a radial inner surface, a radial outer surface, a rear face and a front face axial spaced from the rear face and including multiple teeth. The second clutch member has a rotational axis, a radial inner surface, a radial outer surface, a rear face and a front face axial spaced from the rear face and including multiple teeth. The teeth of the first clutch member and the teeth of the second clutch member are parallel to each other and are axially inclined such that the teeth do not extend parallel to a radius from the axis.

In at least some implementations, the first clutch member is fixed against axial movement and the second clutch member moves axially relative to the first clutch member to define connected and disconnected states of the clutch.

In at least some implementations, the teeth extend at an angle of between 5 degrees and 30 degrees relative to a line extending radially. In at least some implementations, a radially inner end of each tooth of the first clutch member is axially farther from the rear face of the first clutch member than is a radially outer end of each tooth.

In at least some implementations, at least a portion of the radial inner surface of the first clutch member is shaped as part of a sphere.

In at least some implementations, the first clutch member includes an opening adapted to receive a pinion gear shaft, and the distance from the opening to the front face of the first clutch member is equal to or greater than the distance from the opening to the rear face of the first clutch member.

BRIEF DESCRIPTION OF THE DRAWINGS

The following detailed description of preferred embodiments and best mode will be set forth with reference to the accompanying drawings, in which.

DETAILED DESCRIPTION

Figure 1:
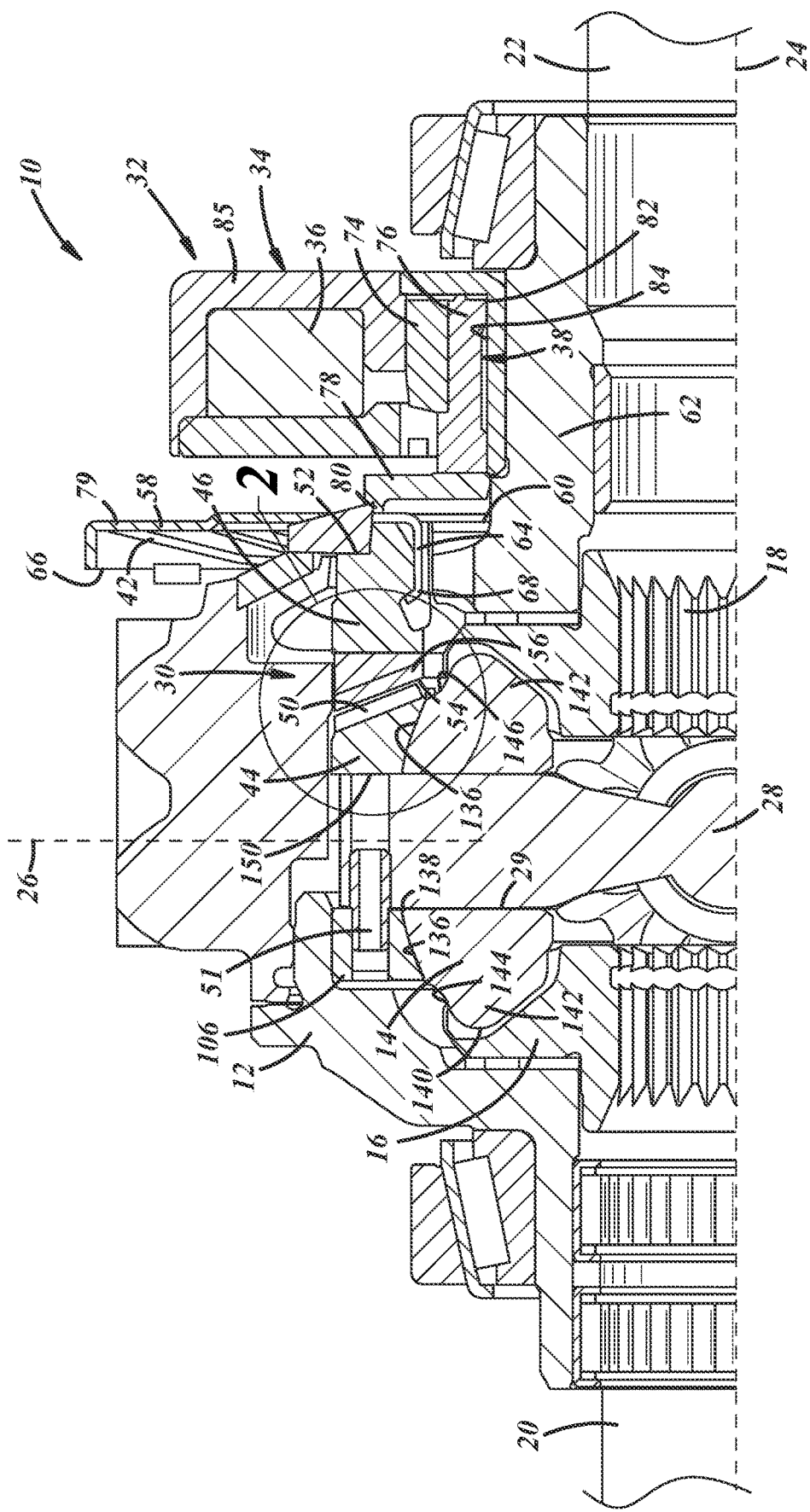
FIG. 1 is a sectional view of half of a rotary power transmission device including a differential with a clutch.

Referring in more detail to the drawings, FIG. 1 illustrates a portion of a differential 10 such as may be used in an e-axle (e.g. an e-motor driven final drive unit) or any power transmission system. The differential 10 includes an outer housing 12, a pair of pinion gears 14 (only one shown in FIGS. 1 and 2), and a pair of side gears 16, 18 that are arranged to be coupled to rotating shafts 20, 22 that may drive, for example, wheels of a vehicle. Thus, the side gears 16, 18 rotate with the shafts 20, 22 (shown diagrammatically in FIG. 1) about a shaft axis 24 and the pinion gears 14 are rotatable about an axis 26 defined by a pinion gear shaft 28 extending through openings 29 in the pinion gears.

Figure 2:
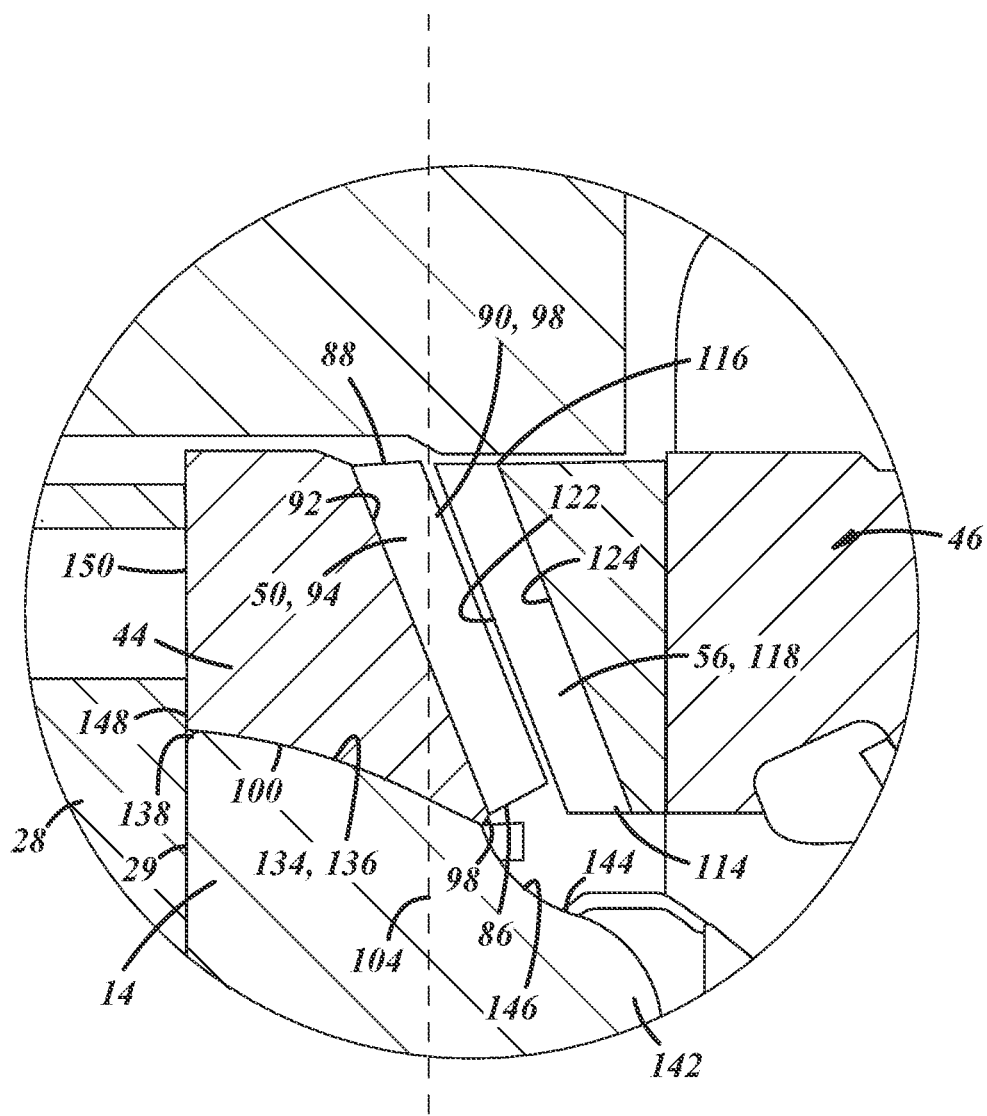
FIG. 2 is an enlarged view of the encircled portion of FIG. 1.

The differential 10 also includes a clutch assembly 30 that is driven by an actuator 32, that, in at least some implementations, has a solenoid 34 with an annular wire coil 36 and a drive member that may include an armature or plunger 38 that may be received at least partially radially inwardly of and axially overlapped with the coil 36. In at least some implementations, the plunger 38 is also annular, the plunger and coil 36 are coaxially arranged about axis 24 and are carried by the outer housing 12 of the differential 10 for rotation with the outer housing 12. One shaft 20 extends coaxially through a portion of the housing 12 that extends through the coil 36 and plunger 38. Electric power is supplied to the coil 36 to generate a magnetic field that displaces the plunger 38 relative to the coil 36 and outer housing 12 from a first or retracted position (FIG. 1) to a second or advanced position (FIG. 2). To facilitate return of the plunger 38 from the second position back to the first position when power is not provided to the coil 36, a biasing member, such as a spring 42 may act on the plunger 38, or on a component engaged with the plunger, as set forth below. In at least some implementations, the clutch assembly 30 is engaged when the plunger 38 is in the second position and the clutch assembly 30 is disengaged when the plunger 38 is in the first position. While in the example shown the plunger 38 is in its second position when power is provided to the coil 36 and the plunger 38 moves to the first position when power is not supplied to the coil 36, the opposite could be true if desired (e.g. the clutch assembly 30 could be moved to the engaged position by the biasing member 42 and disengaged by powering the coil 36). Further, the actuator need not include a solenoid coil 36 and could include a different mechanism, such as a motor, hydraulic or pneumatic actuator.

In at least some implementations, the clutch assembly 30 is an engaging clutch such as a dog clutch, and includes a first clutch member 44 that is not movable in an axial direction (defined by the central axis 24 of the plunger), and a second clutch member 46 that is movable in the axial direction relative to the first member 44.

In at least some implementations, the clutch assembly 30 may be used, for example, in a so-called free running differential 10, that selectively interrupts and permits torque transmission therethrough. In this device, a first rotating body is the outer differential housing 12 and a second rotating body is the first clutch member 44, and the first rotating body and the second rotating body rotate about a common rotational axis 24. In the implementation shown, the first clutch member 44 is coupled to the pinion gear shaft 26 by a pin or bolt 51 and is constrained against axial movement relative to the second clutch member 46.

Referring to FIG. 2, the second clutch member 46 may be coaxial with the axis 24 of the plunger 38, and may be received outboard of the pinion gear 14 (i.e. farther from the axis 24 than the pinion gear 14). The second clutch member 46 may include a rear face 52 closer to the plunger 38 than a front face 54, with the front face 54 having at least one engagement feature, such as gear or clutch teeth 56 (e.g. dog clutch teeth) configured to engage a corresponding engagement feature (e.g. gear or dog clutch teeth 50) formed on the first clutch member 44.

In at least some implementations, the second clutch member 46 may be connected to a carrier 58. The carrier 58 may radially position the second clutch member 46 and/or provide a radially outer surface that is detected by a suitable sensor to enable detection of the position of the second clutch member 46 (and hence, determination of the state of the clutch 30), as desired. In the implementation shown, the carrier 58 is annular and includes a central opening 60 received over a tubular portion 62 of the outer housing 12 about which the plunger 38 is received. An axially extending support may be defined by an annular flange 64, or spaced apart fingers radially spaced from the opening 60, to connect the carrier 58 to the second clutch member 46 at a location radially spaced from the tubular portion 62 of the outer housing 12, in at least some implementations. The second clutch member 46 may be trapped between a first face 66 of the carrier 58 adjacent to the rear face 52 of the second clutch member 46 and a radially bent end 68 of the support surface 64 that engages a radially extending surface of the second clutch member 46, shown as being defined in a groove formed in a radially inner surface of the second clutch member 46. In this way, the carrier 58 and second clutch member 46 move together in both directions of movement of the second clutch member 46. The spring 42 may be retained by and act on the first face 66 of the carrier 58 to bias second clutch member 46 to a retracted position in which the second clutch member teeth 56 are not meshed with the first clutch member teeth 50. The spring 42 may be received between a portion of the outer housing 12 and a portion of the carrier 58 and may be located radially inwardly or radially outwardly of the second clutch member 46, or both (e.g. more than one spring may be provided). Like the coil 36 and plunger 38, the second clutch member 46 also is carried by and rotates with the outer housing 12.

The plunger 38 may be formed from multiple materials including a material that is magnetically responsive to the magnetic field generated by the coil 36, and at least one other material that may or might not be responsive to the magnetic field. Thus, when the magnetic field is generated by the coil 36, the plunger 38 may be driven from one position to another (e.g. from the retracted to the advanced position). As used herein, a material is responsive to a magnetic field if a magnetic field of the magnitude generated by a solenoid 34 of the type used in applications such as that described herein, may cause a component formed of or including such material to be displaced.

In at least some implementations, as shown in FIGS. 1 and 2, the plunger 38 includes a main body with a central axis that may be coaxial with axis 24, and the plunger 38 may be defined by a first body 74 and a second body 76 that are coupled together and move as one unit or component and are not separated during use. The first body 74 may be formed from a magnetically responsive material and may be received adjacent to and radially inwardly of the coil 36, with a small air gap between them. The second body 76 may have at least a portion that is radially inward of at least a portion of the first body 74. The second body 76 may be annular and may, in at least some implementations, radially overlap part of the first body 74. The second body 76 may be conveniently overmolded onto the first body 74 to facilitate forming the second body and connecting together the first and second bodies, however other forming processes such as but not limited to casting, stamping, sintering or extruding may be used.

In the implementation shown, the plunger 38 includes or is associated with a radially outwardly extending end piece 78 that has an axially extending rim 80 that engages a second face 79 the carrier 58 at a position radially overlapped by the second clutch member 46. That is, the rim 80 is radially aligned with the second clutch member 46. The end piece 78 may be formed in the same piece of material as the second body 76 or as a separate component that is fixed to the second body 76 in at least some implementations. Of course, other implementations may be utilized, as desired. The second body 76 may be formed from a material that is not magnetically responsive (e.g. plastic, aluminum, stainless steel, etc.), and may provide a magnetic flux shield of sorts that improves the magnetic field strength on or in the area of the first body 74 to ensure proper response of the plunger 38 when the coil 36 is energized. In this way, the magnetic field is more concentrated or stronger in the area of the first body 74 to increase the magnetic flux at or in the first body and improve the responsiveness of the plunger 38 to the generated magnetic field.

As shown in FIGS. 1 and 2, the second body 76 may have an inner surface 82 that is received adjacent to or around a surface 84 of the differential housing 12. The inner surface 82 may define a pilot diameter for receipt of the plunger 38 over the annular surface 84 of the differential housing 12 or solenoid housing 85 for guided linear, axial movement of the plunger 38 relative to the differential housing 12.

In FIG. 1, the differential 10 is shown with the clutch 30 in a disengaged position. In the illustrated implementation, in the disengaged position of the clutch 30, the coil 36 is not powered, the spring 42 acts on the carrier 58 and connected second clutch member 46 and the plunger 38 via the carrier. The plunger 38 is in its first position (i.e. retracted position) and the second clutch member 46 also is in its first position (i.e. retracted position) in which it is not engaged with the first clutch member 44. That is, second clutch member teeth 56 are not meshed with the first clutch member teeth 50, and this may be called the disconnected state of the clutch 30. In the disconnected state of the clutch 30, the shafts/axles 20, 22 are not actively driven and may rotate relative to the second clutch member 46 and outer housing 12.

To change the clutch 30 from the disengaged state to an engaged state, the coil 36 is powered to generate a magnetic field that drives the plunger 38 to its second position (i.e. advanced position) which drives the second clutch member 46 into engagement with the first clutch member (i.e. teeth 58 engage and mesh with teeth 50). In this connected state of the clutch 30, the first clutch member 44 is coupled to and rotates with the outer housing 12 and torque is transmitted to the axles 20, 22.

In at least some implementations, it is difficult to handle the desired torque capacity within the available space for the differential or other rotary power transmission device, with higher torque capabilities requiring stronger housings, and larger shafts and gears, leaving less room for the clutch, actuator and other components. In view of this, the area for the engaging features of the clutch, which are clutch teeth in at least some implementations, can be limited.

Figure 3:
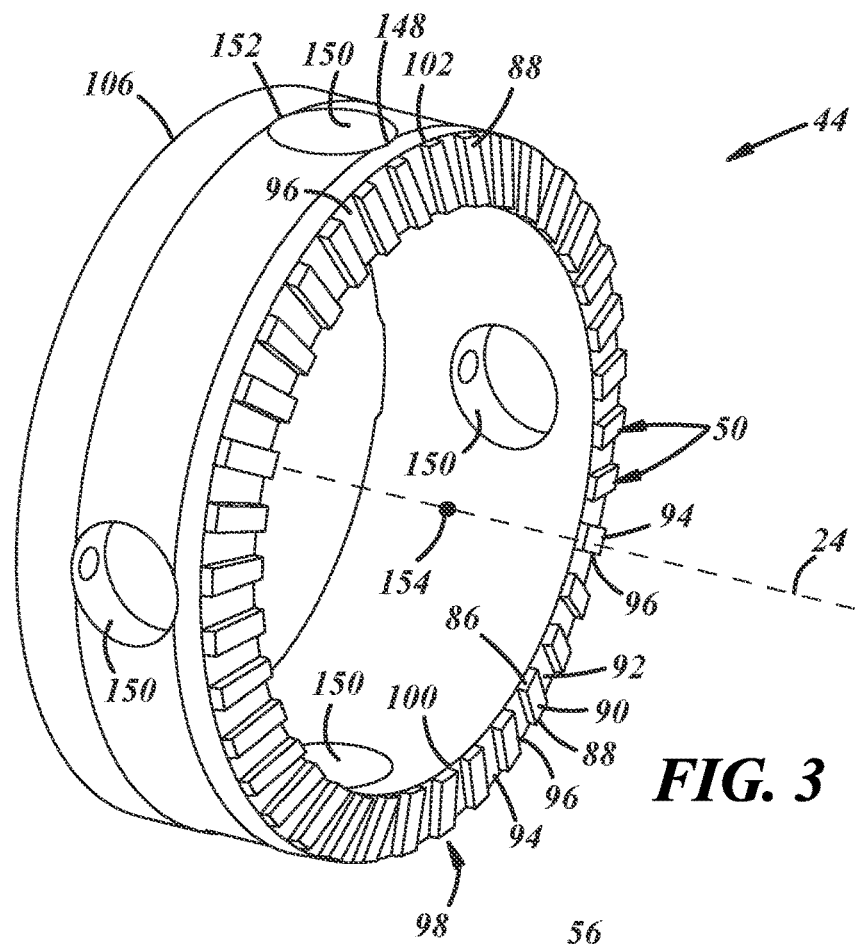
FIG. 3 is a perspective view of a first clutch member.

In at least some implementations, as shown in FIGS. 2 and 3, the first clutch member 44 is annular, includes a central axis of rotation 24 and includes teeth 50 having a radial length between a radial inner end 86 and a radial outer end 88 of the teeth, axial depth between a tip 90 (e.g. axially outermost portion) of each tooth 50 and a base 92 between adjacent teeth, and a circumferential thickness between opposite sides 94, 96 of each tooth. Further, the teeth 50 are circumferentially spaced apart, and may extend around the entire front face 98 of the first clutch member 44. The radial length of the teeth 50 is limited by the radial dimension of the first clutch member 44 between a radial inner surface 100 and a radial outer surface 102, which, in the implementations shown, must fit between an interior surface of the housing 12 and outer surfaces of the pinion gears 14. The circumferential thickness of the teeth 50 may vary from the tip 90 to the base 92 (for example, the teeth adjacent to the bases may be thicker than at the tips), the teeth 50 may be circumferentially thicker at the radially outer end 88 than the radially inner end 86 (with an example having the sides 94, 96 of the teeth 50 radially oriented) or the circumferential thickness may be the same along the axial depth and radial length of the teeth, as desired. The sides 94, 96 of the teeth 50 may be planar and perpendicular to the axis 24, or they may be oriented at a different angle.

The teeth 50 are not arranged parallel to a plane 104 (FIG. 2) that is perpendicular to the axis 24 of the first clutch member 44, and are instead inclined thereto. In the example shown, the radially inner end 86 of each tooth 50 is axially farther from a rear face 106 (labeled in FIGS. 1 and 3) of the first clutch member 44 than is a radially outer end 88 of each tooth 50. In this way, the teeth 50 are axially inclined and have a length along the axially outermost portion or tip 90 that is greater than the radial dimension between the radial inner and radial outer surfaces 100, 102 of the first clutch member 44. In at least some implementations, the teeth 50 are inclined at an angle of between 5 degrees and 30 degrees relative to the plane 104, and in some implementations the angle is 15 degrees to 25 degrees.

Figure 4:
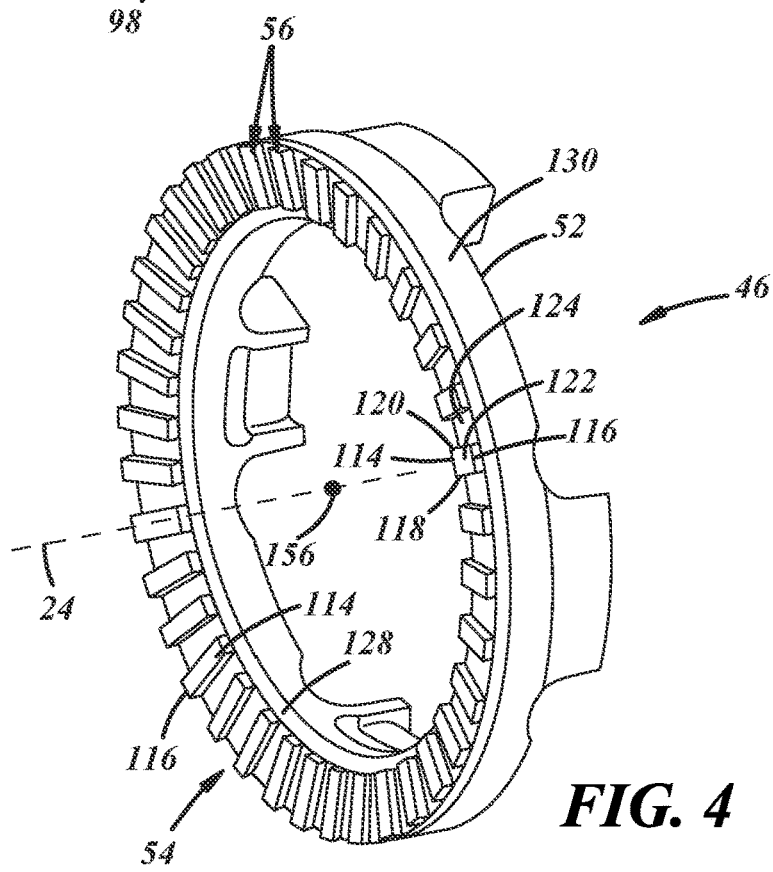
FIG. 4 is a perspective view of a second clutch member.

To enable meshing with the first clutch member 44, the second clutch member teeth 56 are formed complementary to the first clutch member teeth 50. As shown in FIGS. 2 and 4, the teeth 56 of the second clutch member 46 have a radial length between radial inner and radial outer ends 114, 116 of each tooth 56, circumferential thickness between opposites sides 118, 120 of each tooth, and axial depth from a tip 122 to a base 124 between tips of adjacent teeth 56. The circumferential thickness and spacing, and the axial depth of the teeth 56 are chosen to fit between and mesh with the teeth 50 of the first clutch member 44. The radial length of the second clutch member teeth 56 may be the same as or different than the radial length of the first clutch member teeth 50, as desired. In the example shown, the front face 54 and teeth 56 of the second clutch member 46 are axially inclined, and are not parallel to a plane 104 perpendicular to the central axis 24 of the second clutch member 46. In this example, the second clutch member teeth 56 are axially farther from the rear face 52 of the second clutch member 46 at the radially outer end 116 of the teeth 56 than at radially inner end 114 of the teeth 56. And the angle at which the teeth 56 are axially inclined is, in at least some implementations, the same as the angle of the first clutch member teeth 50.

In at least some implementations, such as that shown in FIGS. 1 and 2, the outer surface 134 of each pinion gear 14 is rounded and as shown, includes an interface surface 136 overlapped by the first clutch member 44 and the interface surface 136 is a portion of a sphere. The interface surface 136 extends from a radially inner edge 138 of the axially outer surface 134 of the pinion gear 14 to a point between the inner edge 138 and the radially outer edge 140 (FIG. 1) of the pinion gear 14 (where the radially outer edge 140 may be defined by the tips of the radially outwardly extending pinion gear teeth 142). In the example shown, the interface surface 136 extends more than half of the distance from the radial inner edge 138 to the base or root 144 of the teeth 142 of the pinion gear 14, and it may extend that full distance, if desired. In the example shown, the interface surface 136 extends more than 80% of the distance from the radial inner edge 138 to the base or root 144 of the teeth 142 of the pinion gear 14, and an axial step 146 extends from the interface surface 136 to the teeth 142 of the pinion gear 14, so that the upper surface 134 of the pinion gear teeth 142 is axially offset and is not continuous from the interface surface 136. Correspondingly, the radial inner surface 100 of the first clutch member 44 is complementarily shaped to the interface surface of the pinion gear and/or the outer surface of washers 112 located between the first clutch member 44 and the pinion gears 14, if such washers are provided which is not required. So formed, the inner surface 100 of the first clutch member 44 is not a right circular cylinder and instead includes some curvature, and is shown as being a portion of a sphere that is equivalent and complementary to the interface surface 136 of the pinion gears 14.

In the example show, the first clutch member 44 overlaps the entire interface surface 136 of each pinion gear 14. In other words, the axial distance (relative to axis 24) from the front face 98 to the nearest point 148 of an opening 150 that receives the pinion gear shaft 28 is at least equal to the corresponding dimension of the interface surface 136, and the axial distance from the rear face 106 to nearest point 152 of the opening 150 is at least equal to the corresponding dimension of the interface surface. So arranged, the outer edge or front face 98 of the first clutch member 44 at the radial inner surface 100 of the clutch member 44, is at the outer edge of, or extends over and is not located within the interface surface 136. In use, the pinion gears 14 rotate about and relative to the pinion gear shaft 28, and relative to the first clutch member 44. Lubrication between the pinion gear 14 and the first clutch member 44 reduces friction and wear. If the first clutch member 44 did not overlap all of the interface surface, then the edge of the inner surface 100 of the first clutch member 44, at the front face 98, would tend to scrape lubricant off the pinion gear 14 as the pinion gear 14 rotates, reducing the effectiveness of the lubricant and leading to wear of the components and possibly seizure of the differential. Further, if the first clutch member 44 overlaps the interface surface unevenly, then an uneven pressure or force profile can be applied or occur between the interface surface and the first clutch member 44, which can affect lubricant distribution and wear of the components. While the first clutch member 44 is shown with four openings 150 to receive two pinion shafts 28 on which four pinion gears 14 are received (two gears 14 on each shaft 28), the device may use a pair of pinion gears 14 and one pinion gear shaft 28 in which case the first clutch member would have just two openings 150 for that one shaft 28.

Further, simply extending the first clutch member 44 to extend farther toward the second clutch member 46, with teeth 50 that extend radially and that are not inclined as shown, would reduce the space between the first clutch member 44 and the actuator 32, and would require the second clutch member 46 to be thinner and weaker, or the actuator 32 to be moved making the overall device larger and heavier. The inclined teeth 50 permit the radially inner surface 100 of the first clutch member 44 to be thicker and to fully overlie the interface surface 136, while also permitting the second clutch member 46 to be made thicker at the radial outer portion thereof, for increased strength of the second clutch member 46. As shown in FIG. 4, the second clutch member 46 is often a thinner member sandwiched between the first clutch member 44 and plunger 38. Thus, the inclined teeth 50 of the first clutch member 44 enable a desired interface with the second clutch member teeth 56 without requiring undue reduction in the strength of the second clutch member 46. In at least some implementations, due to the inclination of the teeth and thus, the front faces of the first and second clutch members 44, 46, the front face 98 of the first clutch member 44 may be convex (e.g. outwardly inclined away from a center of mass 154 (FIG. 3) from the radially outer surface to the radially inner surface) while the front face of the second clutch member may be concave (e.g. inwardly inclined toward a center of mass 156 (FIG. 4) from the radially outer surface to the radially inner surface).

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A rotary power transmission device, comprising:
a housing;
a pinion gear shaft received within the housing, the pinion gear shaft having a pinion gear shaft axis;
a pinion gear having an opening through which the pinion gear shaft is received so that the pinion gear is rotatable relative to the pinion gear shaft, the pinion gear having an axially outer surface;
a first clutch member having a rotational axis perpendicular to the pinion gear shaft axis, a radial inner surface, a radial outer surface, a rear face and a front face axial spaced, relative to the rotational axis, from the rear face, and multiple teeth at the front face; and
a second clutch member coaxially arranged with the first clutch member, and the second clutch member has a radial inner surface, a radial outer surface, a rear face and a front face that is axially spaced, relative to the rotational axis, from the rear face, and multiple teeth, wherein the pinion gear has an interface surface at the axially outer surface of the pinion gear and extending radially from the opening, and the radial inner surface of the first clutch member is located axially outwardly of the interface surface and the radial inner surface of the first clutch member fully overlaps the interface surface, and wherein the teeth of the first clutch member have a radially inner end that is axially farther from the rear face of the first clutch member than are a radially outer end of the teeth of the first clutch member, where axially farther is relative to the rotational axis.

2. The device of claim 1 wherein the interface surface is shaped as part of a sphere and a portion of the radial inner surface of the first clutch member that overlies the interface surface is complementarily shaped as part of a sphere.

3. The device of claim 1 wherein the teeth of the first clutch member and the teeth of the second clutch member are parallel to each other and are axially inclined such that the teeth do not extend parallel to the pinion gear shaft axis.

4. The device of claim 3 wherein the radial inner surface of the front face of the first clutch member is farther from the pinion gear shaft axis than the radial outer surface of the front face of the first clutch member.

5. The device of claim 1 wherein the pinion gear includes teeth extending radially outwardly beyond the interface surface, and the interface surface extends at least 50% of the distance from the opening to the root of the teeth of the pinion gear.

6. The device of claim 1 wherein the first clutch member is coupled to the pinion gear shaft so that the first clutch member does not move relative to the pinion gear shaft and the pinion gear rotates relative to the first clutch member.

7. The device of claim 1 wherein the first clutch member includes an opening in which the pinion shaft is received, and the distance from the opening to the front face of the first clutch member is equal to or greater than the distance from the opening to the rear face of the first clutch member.

8. The device of claim 1 wherein the front face of the first clutch member is annular and convex.

9. The device of claim 1 wherein the front face of the second clutch member is annular and concave.

10. A clutch for a rotary power transmission device, comprising:
- a first clutch member having a rotational axis, a radial inner surface, a radial outer surface, a rear face and a front face axial spaced from the rear face and including multiple teeth; and
- a second clutch member having a rotational axis, a radial inner surface, a radial outer surface, a rear face and a front face axial spaced from the rear face and including multiple teeth, wherein the teeth of the first clutch member and the teeth of the second clutch member are parallel to each other and are axially inclined such that the teeth do not extend parallel to a radius from the axis.

11. The clutch of claim 10 wherein the first clutch member is fixed against axial movement and the second clutch member moves axially relative to the first clutch member to define connected and disconnected states.

12. The clutch of claim 10 wherein the teeth of the first clutch member extend at an angle of between 5 degrees and 30 degrees relative to a line extending radially.

13. The clutch of claim 10 wherein a radially inner end of each tooth of the first clutch member is axially farther from the rear face of the first clutch member than is a radially outer end of each tooth.

14. The clutch of claim 10 wherein at least a portion of the radial inner surface of the first clutch member is shaped as part of a sphere.

15. The clutch of claim 10 wherein the first clutch member includes an opening adapted to receive a pinion gear shaft, and the distance from the opening to the front face of the first clutch member is equal to or greater than the distance from the opening to the rear face of the first clutch member.

16. The clutch of claim 10 wherein the front face of the first clutch member is annular and convex.

17. The clutch of claim 10 wherein the front face of the second clutch member is annular and concave.

18. A rotary power transmission device, comprising:
- a housing;
- a pinion gear shaft received within the housing, the pinion gear shaft having a pinion gear shaft axis;
- a pinion gear having an opening through which the pinion gear shaft is received so that the pinion gear is rotatable relative to the pinion gear shaft;
- a first clutch member having a rotational axis perpendicular to the pinion gear shaft axis, a radial inner surface, a radial outer surface, a rear face and a front face axial spaced, relative to the rotational axis, from the rear face, and multiple teeth at the front face, the first clutch member is coupled to the pinion gear shaft so that the first clutch member does not move relative to the pinion gear shaft and the pinion gear rotates relative to the first clutch member; and
- a second clutch member coaxially arranged with the first clutch member, and the second clutch member has a radial inner surface, a radial outer surface, a rear face and a front face that is axially spaced, relative to the rotational axis, from the rear face, and multiple teeth, wherein the pinion gear has an interface surface extending radially from the opening and the radial inner surface of the first clutch member is located axially outwardly of the interface surface and the radial inner surface of the first clutch member radially overlaps the interface surface, and the teeth of the first clutch member have a radially inner end that is axially farther from the rear face of the first clutch member than are a radially outer end of the teeth of the first clutch member, where axially farther is relative to the rotational axis.

19. The device of claim 18 wherein the first clutch member includes an opening in which the pinion shaft is received, and the distance from the opening to the front face of the first clutch member is equal to or greater than the distance from the opening to the rear face of the first clutch member.

* * * * *